(12) United States Patent
Liu et al.

(10) Patent No.: US 8,400,359 B2
(45) Date of Patent: Mar. 19, 2013

(54) METHOD AND SYSTEM FOR INDOOR POSITIONING

(75) Inventors: Yung-Chih Liu, Taipei (TW); Chi-Wen Teng, Taipei County (TW); Wei-Chang Liu, Taichung County (TW)

(73) Assignee: Institute for Information Industry, Taipei (TW)

( * ) Notice: Subject to any disclaimer, the term of this patent is extended or adjusted under 35 U.S.C. 154(b) by 493 days.

(21) Appl. No.: 12/630,849

(22) Filed: Dec. 4, 2009

(65) Prior Publication Data

US 2011/0090124 A1 Apr. 21, 2011

(30) Foreign Application Priority Data

Oct. 20, 2009 (TW) ................................ 98135486 A (51) Int. Cl.
*G01S 3/02* (2006.01)
(52) U.S. Cl. ....................................... 342/463
(58) Field of Classification Search ................... 342/463
See application file for complete search history.

(56) References Cited

U.S. PATENT DOCUMENTS

| 6,091,362 | A  | * | 7/2000  | Stilp et al. ...................... 342/465 |
| 6,249,252 | B1 | * | 6/2001  | Dupray .......................... 342/450 |
| 2005/0157592 | A1 | * | 7/2005  | Nakamura ....................... 368/47 |
| 2009/0080501 | A1 | * | 3/2009  | Kim ............................... 375/211 |
| 2009/0149198 | A1 | * | 6/2009  | Nam et al. .................. 455/456.2 |
| 2009/0253439 | A1 | * | 10/2009 | Gantner et al. ............. 455/456.1 |
| 2010/0271263 | A1 | * | 10/2010 | Moshfeghi ..................... 342/378 |
| 2011/0074569 | A1 | * | 3/2011  | Alsindi et al. ............. 340/539.1 |

* cited by examiner

*Primary Examiner* — Jack W Keith
*Assistant Examiner* — Frank J McGue
(74) *Attorney, Agent, or Firm* — Jianq Chyun IP Office (57) ABSTRACT

A method and a system for indoor positioning are provided. In the present method, a default positioning weight is defined at first. Then, a plurality of neighboring ranging devices near a target device is obtained from all wireless ranging devices deployed in an indoor space, and a current positioning weight of each of the neighboring ranging devices is calculated. Next, the current positioning weight of each of the neighboring ranging devices is respectively compared with the default positioning weight, so as to obtain a plurality of reference ranging devices from the neighboring ranging devices. After calculating at least one candidate coordinate according to a deploy coordinate of each of the reference ranging devices, a positioned coordinate represents the current location of the target device is estimated according to the at least one candidate coordinate.

16 Claims, 3 Drawing Sheets

METHOD AND SYSTEM FOR INDOOR POSITIONING

CROSS-REFERENCE TO RELATED APPLICATION

This application claims the priority benefit of Taiwan application serial no. 98135486, filed on Oct. 20, 2009. The entirety of the above-mentioned patent application is hereby incorporated by reference herein and made a part of this specification.

BACKGROUND OF THE INVENTION

1. Field of the Invention

The present invention relates to a positioning method and a positioning system, and in particular, to a method and a system for accurately indoor positioning.

2. Description of Related Art

The global positioning system (GPS) is constructed by satellites in space, the monitoring stations on the ground and the GPS receiver of the user end. Since the GPS positioning is implemented based on the triangulation positioning theory, at least three satellites are required in positioning the GPS receiver of user end. In other words, as long as the user is in the region with the satellite signal reception, the user can utilize the GPS to obtain the positioning data and the navigation data.

When the GPS receiver of the user end is located in the indoor environment, such as being inside the building, since the satellite signal is blocked by the building, the data for positioning is not enough for implementing the positioning. In order to solve the problem mentioned above, the positioning techniques, such as infrared positioning, Bluetooth positioning and wireless sensor positioning, adopted for indoor positioning are developed.

As for the infrared positioning technique, since the light cannot pass through the blocks, the infrared positioning technique has the disadvantages of short straight-line view distance and short transmission distance. The Bluetooth positioning technique is limited by the complexity of the environment. Once the environment is too complex, the stability of the Bluetooth system is getting worse. The wireless sensor positioning technique including methods of time-of-arrival (TOA), time-difference-of-arrival (TDOA), angle-of-arrival (AOA) and signal-strength-ranging (SSR) is used for indoor ranging and positioning. However, in the aforementioned ranging methods, the fact that the signal is affected by the non-line-of-sight (NLOS) transmission easily leads to the inaccurate positioning result. Moreover, when the number of the positioning target is over mass, the large TOA ranging will lead to the congested wireless network.

SUMMARY OF THE INVENTION

The invention provides a method for indoor positioning capable of avoiding the problems of positioning delay and drifting and accurately positioning a coordinate of a target device in an indoor environment.

The invention provides a system for indoor positioning capable of combining signal strength and distance data for decreasing unnecessary data during positioning to effectively positioning the target device.

The invention provides a method for indoor positioning a target device in an indoor environment, in which a plurality of wireless ranging devices are deployed. In the present method, a default positioning weight is defined, first. Then, all of the wireless ranging devices are scanned for obtaining a plurality of neighboring ranging devices near the target device and a current positioning weight of each of the neighboring ranging devices is calculated. Thereafter, the default positioning weight is respectively compared with the current positioning weight of each of the neighboring ranging devices so as to obtain a plurality of reference ranging devices among the neighboring ranging devices. At least a candidate coordinate is calculated according to a deploy coordinate of each of the reference ranging devices in the indoor environment and then a positioning coordinate at which the target device is located is estimated according to the at least candidate coordinate.

In one embodiment of the present invention, the step of defining the default positioning weight comprises: obtaining a plurality of distances respectively between the target device and the wireless ranging devices through a packet exchange mechanism and obtaining a plurality of receive-signal-strength indications (RSSI) received by the target device respectively from the wireless ranging devices. Finally, the default positioning weight is calculated according to the obtained distances and the obtained receive-signal-strength indications.

In one embodiment of the present invention, the step of calculating the current positioning weight of each of the neighboring ranging devices comprises: obtaining a latest history positioning coordinate of the target device, and obtaining a plurality of latest history receive-signal-strength indications received by the target device respectively from the neighboring ranging devices, and calculating the current positioning weight of each of the neighboring ranging devices according to the latest history positioning coordinate, the latest history receive-signal-strength indications respectively corresponding to the neighboring ranging devices and the deploy coordinate of each of the neighboring ranging devices.

In one embodiment of the present invention, the step of obtaining the reference ranging devices comprises selecting a portion of the neighboring ranging devices as the reference ranging devices, wherein the difference between each of the current positioning weights respectively corresponding to the selected neighboring ranging devices and the default positioning weight is smaller than a predetermined value.

In one embodiment of the present invention, the method for indoor positioning further comprises regarding all of the neighboring ranging devices as the reference ranging devices when the target device is positioned at the first time, and calculating the at least candidate coordinate according to the deploy coordinate of each of the reference ranging devices in the indoor environment, and estimating the positioning coordinate at which the target device is located according to the at least candidate coordinate.

In one embodiment of the present invention, the step of calculating the at least candidate coordinate according to the deploy coordinate of each of the reference ranging devices comprises: when a number of the reference ranging devices is larger than or equal to three, random selecting three of the reference ranging devices as selected devices, and generating at least one of the at least candidate coordinate according to the deploy coordinates respectively corresponding to the selected devices. The method for indoor positioning repeats the step of random selecting three of the reference ranging devices and the step of generating the candidate coordinate until all combinations of the three selected devices random selected from the reference ranging devices are used for generating the candidate coordinates.

In one embodiment of the present invention, the step of estimating the positioning coordinate at which the target device is located according to the at least candidate coordinate comprises: processing the at least candidate coordinate according to a filter algorithm to generate the positioning coordinate.

In one embodiment of the present invention, after the step of estimating the positioning coordinate of the target device according to the at least candidate coordinate, the method for indoor positioning further comprises: regarding the positioning coordinate as a latest history positioning coordinate of the target device, and storing the latest history positioning coordinate.

In one embodiment of the present invention, the wireless ranging devices and the target device conform to a short-distance wireless communication standard.

From the other perspective, the invention provides an indoor positioning system comprising a plurality of wireless ranging devices, a target device and a positioning server deployed in an indoor environment. When the target device is located in the indoor environment, the target device is coupled to the wireless ranging devices through a wireless sensing network, and a plurality of neighboring ranging devices are obtained by scanning the wireless ranging devices. The positioning server is coupled to a storage unit and a display unit for defining a default positioning weight, and the positioning server calculates a current positioning weight of each of the neighboring ranging devices after obtaining the neighboring ranging devices. The positioning server compares the default positioning weight with the current positioning weight of each of the neighboring ranging devices so as to obtain a plurality of reference ranging devices among the neighboring ranging devices, and the positioning server calculates at least a candidate coordinate according to a deploy coordinate of each of the reference ranging devices in the indoor environment, and the positioning server estimates a positioning coordinate at which the target device is located according to the at least candidate coordinate.

In one embodiment of the present invention, the target device obtains a plurality of distances respectively between the target device and the wireless ranging devices through a packet exchange mechanism, and the target device receives a plurality of receive-signal-strength indications respectively from the wireless ranging devices, and the target device transmits the obtained distances and the receive-signal-strength indications to the positioning server. The positioning server calculates the default positioning weight according to the received distances and the received receive-signal-strength indications.

In one embodiment of the present invention, the positioning server obtains a latest history positioning coordinate of the target device, and the positioning server obtains a plurality latest history receive-signal-strength indications received by the target device respectively from the neighboring ranging devices, and the positioning server calculates the current positioning weight of each of the neighboring ranging devices according to the latest history positioning coordinate, the latest history receive-signal-strength indications respectively corresponding to the neighboring ranging devices and the deploy coordinate of each of the neighboring ranging devices.

In one embodiment of the present invention, the positioning server selects a portion of the neighboring ranging devices as the reference ranging devices, and the difference between each of the current positioning weights respectively corresponding to the selected neighboring ranging devices and the default positioning weight is smaller than a predetermined value.

In one embodiment of the present invention, when the positioning server positions the target device at the first time, the positioning server regards all of the neighboring ranging devices as the reference ranging devices, and the positioning server calculates the at least candidate coordinate according to the deploy coordinate of each of the reference ranging devices in the indoor environment, and the positioning server estimates the positioning coordinate at which the target device is located according to the at least candidate coordinate.

In one embodiment of the present invention, when a number of the reference ranging devices is larger than or equal to three, the positioning server random selects three of the reference ranging devices as selected devices, and the positioning server generates at least one of the at least candidate coordinate according to the deploy coordinates respectively corresponding to the selected devices. The positioning server repeats the step of random selecting three of the reference ranging devices and the step of generating the candidate coordinate until all combinations of the three selected devices random selected from the reference ranging devices are used for generating the candidate coordinates.

In one embodiment of the present invention, the positioning server processes the at least candidate coordinate according to a filter algorithm to generate the positioning coordinate.

In one embodiment of the present invention, the positioning server regards the positioning coordinate as a latest history positioning coordinate of the target device, and the positioning server stores the latest history positioning coordinate in the storage unit.

In one embodiment of the present invention, the wireless ranging devices and the target device conform to a short-distance wireless communication standard.

From the other perspective, the invention provides an indoor positioning system comprising a plurality of wireless ranging devices and a target device deployed in an indoor environment, wherein the target device comprises a storage unit and a display unit. The target device defines a default positioning weight. When the target device is located in the indoor environment, the target device is coupled to the wireless ranging devices through a wireless sensing network, and a plurality of neighboring ranging devices are obtained by scanning the wireless ranging devices, and the target device calculates a current positioning weight of each of the neighboring ranging devices. After, the default positioning weight is respectively compared with the current positioning weight of each of the neighboring ranging devices, a plurality of reference ranging devices among the neighboring ranging devices are obtained. The target device calculates at least a candidate coordinate according to a deploy coordinate of each of the reference ranging devices in the indoor environment and then estimates a positioning coordinate at which the target device is located according to the at least candidate coordinate.

In one embodiment of the present invention, when the target device is positioned at the first time, all of the neighboring ranging devices are regarded as the reference ranging devices, and the at least candidate coordinate is calculated according to the deploy coordinate of each of the reference ranging devices in the indoor environment, and the positioning coordinate at which the target device is located is estimated according to the at least candidate coordinate.

Accordingly, in the present invention, when the target device is positioned by using the wireless ranging devices in the indoor environment, the reference ranging devices, which benefit to the indoor positioning, are selected among the neighboring ranging devices near the target device according to the ratio of the distance to the receive-signal-strength indication of each of the neighboring ranging devices. Hence, the indoor positioning mechanism can be prevented from misusing the error data provided by the inadequate wireless ranging devices. Thus, the accuracy of the positioning result is improved.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
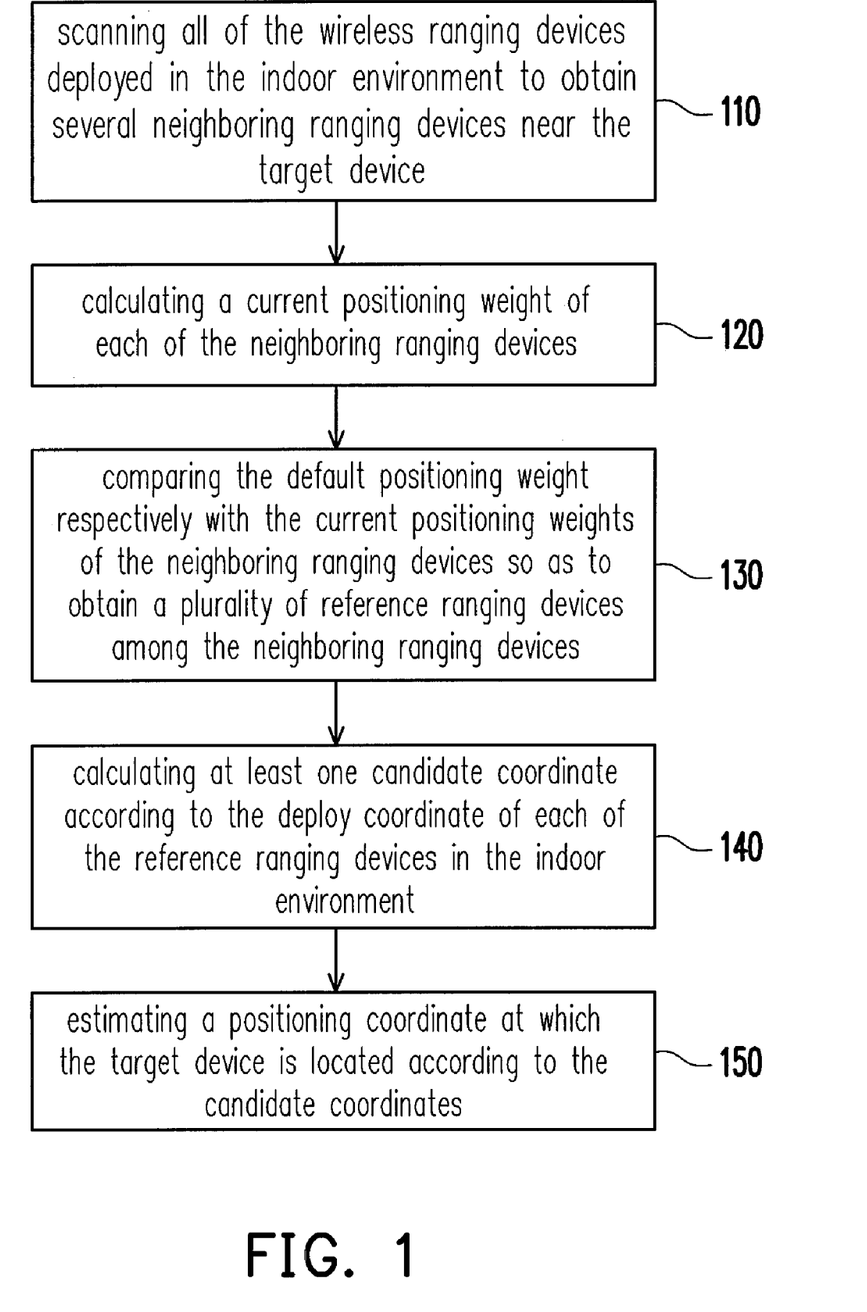
FIG. 1 is a flow chart illustrating a method for indoor positioning according to one embodiment of the invention.

FIG. 1 is a flow chart illustrating a method for indoor positioning according to one embodiment of the invention and the following description illustrates the details for indoor positioning a target device in an indoor environment, in which a plurality of wireless ranging devices are deployed. Before the target device is positioned, the method for indoor positioning of the present invention defines a default positioning weight corresponding to the indoor environment without being interfered. Further, in the later process for positioning the target device, the default positioning weight is used to obtain the proper wireless ranging device as the reference ranging device for positioning.

In the present embodiment, it is assumed that all of the wireless ranging devices and the target device conform to a short-distance wireless communication standard such as the IEEE 802.15.4a communication standard. Since the devices conforming the IEEE 802.15.4a communication standard support the symmetric double-sided two way ranging (SDS-TWR) method to calculate the distance between two devices, while the default positioning weight is defined, distances between the target device and the wireless ranging devices can be obtained through a packet exchange mechanism. For instance, the time for exchanging the packet between the target device and the wireless ranging device twice is used for measuring the distance between the target device and the wireless ranging device. Then, receive-signal-strength indications (RSSI) received by the target device respectively from the wireless ranging devices are obtained. Finally, the default positioning weight is calculated according to the obtained distances and the obtained receive-signal-strength indications.

For instance, in the present embodiment, first of all, a sub-default positioning weight $DSW_i$ corresponding to the wireless ranging device i is calculated according to the following equation:

$$DSW_i = \frac{RD_i}{10^{((|RSSI_i - A|)/(10 \times n))}},$$

wherein $RD_i$ represents a distance between the target device and the wireless ranging device i obtained through a packet exchange mechanism. Further, $RSSI_i$ represents the receive-signal-strength indication of the signal received by the target device from the wireless ranging device i without being interfered. Also, A indicates the platform converting parameter. When the communication standard of the target device and the wireless devices is changed, the value of A is changed accordingly. In addition, n is a signal transmission constant. The sub-default positioning weights respectively corresponding to the wireless ranging devices in the indoor environment can be calculated according to the above equation. Moreover, the default positioning weight corresponding to the indoor environment can be, for example, the average value, the weighted average value or other mathematical operation result of the sub-default positioning weights of the wireless ranging devices, and is not limited herein.

When it is necessary to position the target device in the indoor environment, first of all, as shown in the step 110, the target device can scan all of the wireless ranging devices deployed in the indoor environment to obtain several neighboring ranging devices near the target device. For instance, the closer to the target device the wireless ranging device is, the stronger the signal strength the target device receiving from the wireless ranging device is. Therefore, the target device determines whether the wireless ranging device is the neighboring ranging device according to the receive-signal-strength indications of the signals received by the target device respectively from the wireless ranging device.

In the step 120, a current positioning weight of each of the neighboring ranging devices is calculated. In the present embodiment, the current positioning weight of each of the neighboring ranging devices is calculated by referring to the history data generated in the previous positioning process implemented on the target device. Specifically, when the current positioning weight of each of the neighboring ranging devices are calculated, it is necessary to obtain the latest history positioning coordinate (i.e. the latest positioning result) of the target device and the latest history receive-signal-strength indications respectively corresponding to the neighboring ranging devices. Thereafter, the current positioning weight of each of the neighboring ranging devices is calculated according to the latest history positioning coordinate, the latest history receive-signal-strength indications respectively corresponding to the neighboring ranging devices and the deploy coordinate of each of the neighboring ranging devices. The following equation is an exemplar for calculating a current positioning weight $RTW_j$ of the neighboring ranging device j.

$$RTW_j = \frac{\sqrt{(L(x) - N_j(x))^2 + (L(y) - N_j(y))^2}}{10^{((|RSSI_j - A|)/(10 \times n))}}$$

$RSSI_j$ represents the latest history receive-signal-strength indication of the signal received by the target device from the neighboring ranging device j. $L(x)$ and $L(y)$ respectively represents the x-axis coordinate and y-axis coordinate of the history positioning coordinate of the target device. Further, $N_j(x)$ and $N_j(y)$ respectively represents the x-axis coordinate and y-axis coordinate of the deploy coordinate of the neighboring ranging device j. Also, A indicates the platform converting parameter and n is a signal transmission constant.

Thereafter, in the step 130, the default positioning weight is respectively compared with the current positioning weights of the neighboring ranging devices so as to obtain a plurality of reference ranging devices among the neighboring ranging devices. For instance, in the present embodiment, the differences between the current positioning weights respectively corresponding to the neighboring ranging devices and the default positioning weight are calculated and some of the neighboring ranging devices are selected as the reference ranging devices while the difference between each of the current positioning weights respectively corresponding to the selected neighboring ranging devices and the default positioning weight is smaller than a predetermined value.

In the step 140, at least one candidate coordinate is calculated according to the deploy coordinate of each of the reference ranging devices in the indoor environment. In the present embodiment, the candidate coordinate is calculated by using the three-point positioning method. Thus, it is necessary to determine whether the number of the obtained reference ranging devices is larger than or equal to three. If the number of the obtained reference ranging devices is larger than or equal to three, three of the reference ranging devices are random selected as the selected devices. By using the deploy coordinates respectively corresponding to the selected devices, one of the candidate coordinates is generated. It is assumed that the deploy coordinates respectively corresponding to the three selected devices are (x1,y1), (x2,y2) and (x3,y3). Therefore, the candidate coordinate (xc, yc) can be calculated according to the following equation:

$$\begin{bmatrix} xc \\ yc \end{bmatrix} = \frac{1}{2} \begin{bmatrix} x2-x1 & y2-y1 \\ x3-x1 & y3-y1 \end{bmatrix}^{-1} \begin{bmatrix} x2^2+y2^2-x1^2-y1^2+r1^2-r2^2 \\ x3^2+y3^2-x1^2-y1^2+r1^2-r3^2 \end{bmatrix}$$

wherein r1, r2 and r3 respectively represents the distances between three selected devices and the target device, wherein the distances are obtained through the packet exchange mechanism, such as SDS-TWR method. In the present embodiment, the indoor positioning method repeats the step of random selecting three of the reference ranging devices as the selected devices until all combinations of the three selected devices random selected from the reference ranging devices are used for generating the candidate coordinates. In other words, if the number of the reference ranging devices is five, ten candidate coordinates are generated in the step 140.

Then, as shown in the step 150, a positioning coordinate at which the target device is located is estimated according to the candidate coordinates. In the present embodiment, the candidate coordinates are processed according to a filter algorithm so as to generate the positioning coordinate. The filter algorithm includes Kalman filter algorithm or H-infinity filter algorithm and is not limited herein. Moreover, while the filter algorithm is used to converge the plural candidate coordinates to be the positioning coordinate, the environment error with respect to the wireless interfering or refraction and the device error due to the affection of the hardware design of the device can be used as compensations for generating more improved positioning result.

As shown in FIG. 1, in the present embodiment, when a target device is positioned by using the wireless ranging devices in the indoor environment, the reference ranging devices which contribute to the positioning process are determined according to the data of the receive-signal-strength indications and the distances. Therefore, the amount of the inaccurate positioning data is decreased and the coordinate of the target device can be more accurately calculated. After the positioning coordinate of the target device is calculated, in the present embodiment, a deployment diagram of the indoor environment is obtained. Further, the location, where the target device is currently located, is displayed on the deployment diagram according to the positioning coordinate so that the user can easily view the status of the target device. Moreover, the positioning coordinate currently generated is regarded as a latest history positioning coordinate of the target device and is stored to be the basis for selecting the reference ranging devices in the next positioning process. By repeating the steps shown in FIG. 1 and storing the positioning coordinates generated in each time, the target device constantly moves within the indoor environment can be continuously positioned.

Figure 2:
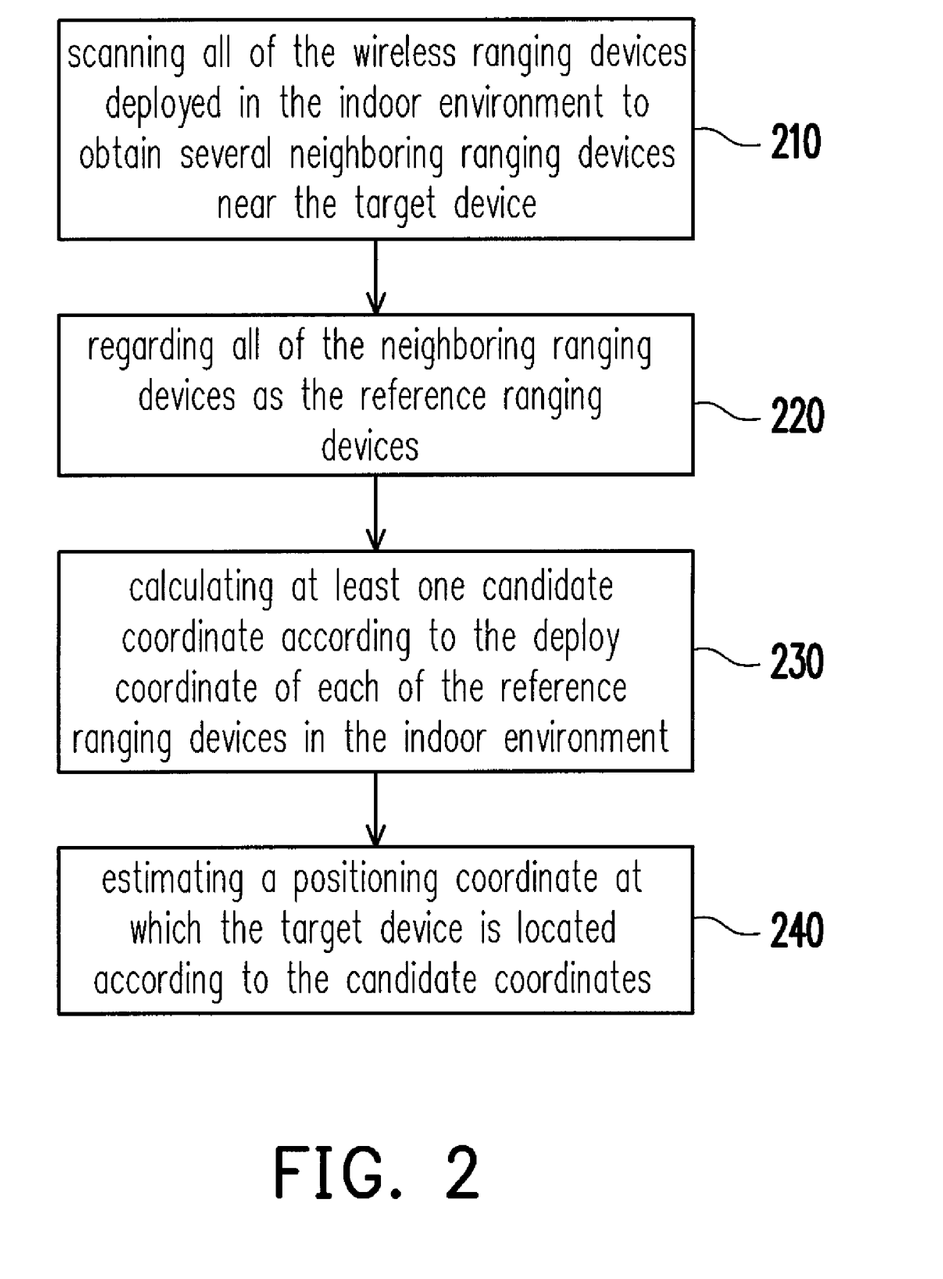
FIG. 2 is a flow chart illustrating a method for indoor positioning according to another embodiment of the invention.

However, it is necessary to refer to the previous positioning result in each time of positioning process. Therefore, the present invention further provides a processing procedure for positioning the target device at the first time. FIG. 2 is a flow chart illustrating a method for indoor positioning according to another embodiment of the invention, and, as shown in the step 210, the target device scans all of the wireless ranging devices deployed in the indoor environment to obtain several neighboring ranging devices near the target device.

At the first time for positioning the target device, because of the lack of the assistance of the previous positioning result, it is hardly to further select proper reference ranging devices from the neighboring ranging devices. Thus, as shown in the step 220, in the present embodiment, all of the neighboring ranging devices are regarded as the reference ranging devices. In the step 230, at least one candidate coordinate is calculated according to the deploy coordinate of each of the reference ranging devices in the indoor environment. Then, as shown in the step 240, a positioning coordinate at which the target device is located is estimated according to the candidate coordinates. Since step 230 and the step 240 shown in FIG. 2 in the present embodiment are the same as or similar to the step 140 and the step 150 shown in FIG. 1 in the above-described embodiment, they will not described again herein. Similarly, after the positioning coordinate of the target device is calculated, the location where the target device is currently located is also shown on the deployment diagram of the indoor environment. Furthermore, the positioning coordinate generated in the first time of the positioning process on the target device is regarded as the first history positioning coordinate.

Figure 3:
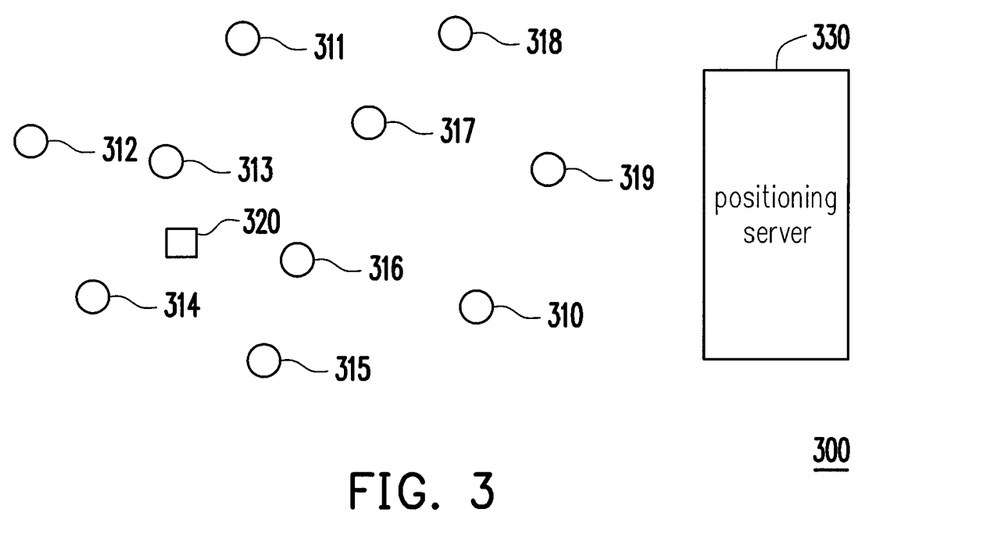
FIG. 3 is a flow chart illustrating an indoor positioning system according to one embodiment of the invention.

The invention also provides an indoor positioning system comprising a plurality of wireless ranging devices, a target device and a positioning server deployed in an indoor environment. FIG. 3 is a flow chart illustrating an indoor positioning system according to one embodiment of the invention. As shown in FIG. 3, the indoor positioning system 300 comprises ten wireless ranging devices including the wireless ranging devices 310 through 319. The wireless ranging devices can be, for example, deployed on the ceiling of the indoor environment or on the walls of the indoor environment and the arrangements of the wireless ranging devices are not limited herein. All of the wireless ranging devices 310~319 and the target device 320 conform to a short-distance wireless communication standard such as the IEEE 802.15.4a communication standard. When the target device 320 is located in the indoor environment, the target device 320 can be coupled to the wireless ranging devices 310~319 through a wireless sensing network.

In the present embodiment, the positioning server 330 can be a computer system or other electronic device having capability of operation processing. The positioning server 330 is coupled to a storage unit (such as the memory or hard disc) and a display unit (such as screen). Further, in the positioning server 330, a default positioning weight is defined.

While the target device 320 is positioned, it only needs to provide the neighboring ranging devices obtained by the target device 320 and the data with respect to the distances between the target device 320 and the neighboring ranging devices to the positioning server 330, and then the positioning server 330 implements the steps mentioned above to select proper reference ranging devices. After at least one candidate coordinate is calculated according to the deploy coordinate of each of the reference ranging devices in the indoor environment, the filter algorithm is used to converge the plural candidate coordinates to estimate the positioning coordinate at which the target device 320 is currently located. Since the methods for the positioning server 330 to calculate the positioning coordinate of the target device 320 is identical or similar to the method in the embodiments aforementioned, the method is not repeated herein.

After the target device 320 is positioned every time, the positioning server 330 obtains a deployment diagram of the indoor environment from the storage unit and displays the deployment diagram on the display unit. Meanwhile, a location, where the target device is currently located, is displayed on the deployment diagram according to the positioning coordinate. The positioning coordinate calculated every time is regarded as the latest history positioning coordinate of the target device 320, and is stored in the storage unit by the positioning server 330.

In the present embodiment, the way that the target device 320 provides the data with respect to the neighboring ranging devices and the distances between the target device 320 and the neighboring ranging devices to the positioning server 330 includes, for example, steps of transmitting the data to the coordinator through the routers (not shown) in the wireless sensing network and transmitting the data collected by the coordinator to the positioning server 330 through the transmission interface (such as the RS232 interface). Since, in every time of the positioning process, the amount of the data provided by the target device 320 to the positioning server 330 is not massive, the bandwidth of the network can be effectively used.

It should be noticed that since every time the target device 320 which is constantly moving is positioned, the positioning server 330 adopts the data of the candidate coordinates and use the filter algorithm to process the data, the positioning error can be corrected, the rate of the positioning is further increased and the user can view the target device 320 smoothly moving in the indoor environment from the display unit.

In another embodiment of the present invention, the indoor positioning system includes a plurality of wireless ranging devices and a target device deployed in the indoor environment. The target device includes a storage unit and a display unit and possesses the capabilities of data operating and data processing. Hence, the difference between the indoor positioning system of present embodiment and the indoor positioning system 300 shown in FIG. 3 is that the target device itself can select the proper reference ranging devices from the neighboring ranging devices after the target device obtains the neighboring ranging devices, and calculates the plural candidate coordinates by referring to the reference ranging devices, and converges the aforementioned candidate coordinates to be the positioning coordinate representing the location where the target device is currently located by using the filter algorithm. While the positioning coordinate is displayed on the deployment diagram of the indoor environment on the display unit, the user can acknowledge the current location status of the target device in the indoor environment. Similarly, the positioning coordinate calculated every time is stored in the storage unit to be regarded as the latest history positioning coordinate of the target device. Since the methods for the target device to calculate the positioning coordinate is identical or similar to the method in the embodiments aforementioned, the method is not repeated herein.

The present invention further provides a computer program product, which is used to execute the above-described indoor positioning method. The computer program product is basically composed of several program command segments (such as setting program command segment, deploying program command segment and so on). After the program commands are loaded into the electronic device (such as the positioning server or target device) and executed, the aforementioned steps of the indoor positioning method can be implemented and the electronic device has the capability of positioning the target device.

According to the above description, the method and system for indoor positioning of the present invention respectively combines the data with respect to the wireless ranging and the data with respect to the receive-signal-strength indications to select the reference ranging devices contribute to the positioning process from the wireless ranging devices near the target device. Further, by referring to the selected reference ranging devices, the more accurate positioning result can be effectively obtained. Moreover, since the final positioning coordinate is obtained by converging the plural candidate coordinates based on the filter algorithm, not only the positioning error can be corrected but also the rate of the positioning is increased. Also, while the positioning result is displayed to the user and further processed by the smoothing process, the displaying result is much closer to the actual moving status of the target device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for indoor positioning a target device in an indoor environment, wherein a plurality of wireless ranging devices are deployed in the indoor environment, the method comprising:

defining a default positioning weight with an electronic device;

scanning the wireless ranging devices for obtaining a plurality of neighboring ranging devices near the target device with the electronic device;

calculating a current positioning weight of each of the neighboring ranging devices with the electronic device;

comparing, with the electronic device, the default positioning weight respectively with the current positioning weight of each of the neighboring ranging devices so as to obtain a plurality of reference ranging devices by selecting a portion of the neighboring ranging devices as the reference ranging devices, wherein the difference between each of the current positioning weights respectively corresponding to the selected neighboring ranging devices and the default positioning weight is smaller than a predetermined value;

calculating at least one candidate coordinate with the electronic device according to a deploy coordinate of each of the reference ranging devices in the indoor environment by randomly selecting three of the reference ranging devices as selected devices while an amount of the reference ranging devices is larger than or equal to three, generating at least one of the at least one candidate coordinate according to the deploy coordinates respectively corresponding to the selected devices, and repeating the step of randomly selecting three of the reference ranging devices and the step of generating the candidate coordinate until all combinations of the three selected devices random selected from the reference ranging devices are used for generating the candidate coordinates; and estimating a positioning coordinate at which the target device is located according to the at least one candidate coordinate with the electronic device.

2. The method of claim 1, wherein the step of defining the default positioning weight comprises:

obtaining a plurality of distances respectively between the target device and the wireless ranging devices through a packet exchange mechanism;

obtaining a plurality of receive-signal-strength indications (RSSI) received by the target device respectively from the wireless ranging devices;

calculating the default positioning weight according to the obtained distances and the obtained receive-signal-strength indications.

3. The method of claim 1, wherein the step of calculating the current positioning weight of each of the neighboring ranging devices comprises:

obtaining a latest history positioning coordinate of the target device;

obtaining a plurality of latest history receive-signal-strength indications received by the target device respectively from the neighboring ranging devices; and calculating the current positioning weight of each of the neighboring ranging devices according to the latest history positioning coordinate, the latest history receive-signal-strength indications respectively corresponding to the neighboring ranging devices and the deploy coordinate of each of the neighboring ranging devices.

4. The method of claim 1, further comprising:

regarding all of the neighboring ranging devices as the reference ranging devices with the electronic device when the target device is positioned at the first time;

calculating the at least one candidate coordinate according to the deploy coordinate of each of the reference ranging devices in the indoor environment with the electronic device; and estimating the positioning coordinate at which the target device is located with the electronic device according to the at least one candidate coordinate.

5. The method of claim 1, wherein the step of estimating the positioning coordinate at which the target device is located according to the at least one candidate coordinate comprises:

processing the at least one candidate coordinate according to a filter algorithm to generate the positioning coordinate.

6. The method of claim 1, after the step of estimating the positioning coordinate of the target device according to the at least one candidate coordinate, further comprising:

regarding the positioning coordinate as a latest history positioning coordinate of the target device; and storing the latest history positioning coordinate.

7. The method of claim 1, wherein the wireless ranging devices and the target device conform to a short-distance wireless communication standard.

8. An indoor positioning system, comprising:

a plurality of wireless ranging devices deployed in an indoor environment;

a target device, wherein when the target device is located in the indoor environment, the target device is coupled to the wireless ranging devices through a wireless sensing network, and a plurality of neighboring ranging devices are obtained by scanning the wireless ranging devices; and a positioning server coupled to a storage unit and a display unit, wherein the positioning server defines a default positioning weight, and the positioning server calculates a current positioning weight of each of the neighboring ranging devices after obtaining the neighboring ranging devices and compares the default positioning weight respectively with the current positioning weight of each of the neighboring ranging devices so as to obtain a plurality of reference ranging devices by selecting a portion of the neighboring ranging devices as the reference ranging devices, wherein the difference between each of the current positioning weights respectively corresponding to the selected neighboring ranging devices and the default positioning weight is smaller than a predetermined value, and the positioning server calculates at least one candidate coordinate according to a deploy coordinate of each of the reference ranging devices in the indoor environment, and the positioning server estimates a positioning coordinate at which the target device is located according to the at least one candidate coordinate, wherein when an amount of the reference ranging devices is larger than or equal to three, the positioning server random selects three of the reference ranging devices as selected devices, and the positioning server generates at least one of the at least one candidate coordinate according to the deploy coordinates respectively corresponding to the selected devices, and the positioning server repeats the step of random selecting three of the reference ranging devices and the step of generating the candidate coordinate until all combinations of the three selected devices random selected from the reference ranging devices are used for generating the candidate coordinates.

9. The indoor positioning system of claim 8, wherein the target device obtains a plurality of distances respectively between the target device and the wireless ranging devices through a packet exchange mechanism, and the target device receives a plurality of receive-signal-strength indications respectively from the wireless ranging devices, and, after receiving the distances and the receive-signal-strength indications from the target device, the positioning server calculates the default positioning weight according to the received distances and the received receive-signal-strength indications.

10. The indoor positioning system of claim 8, wherein the positioning server obtains a latest history positioning coordinate of the target device, and the positioning server obtains a plurality latest history receive-signal-strength indications received by the target device respectively from the neighboring ranging devices, and the positioning server calculates the current positioning weight of each of the neighboring ranging devices according to the latest history positioning coordinate, the latest history receive-signal-strength indications respectively corresponding to the neighboring ranging devices and the deploy coordinate of each of the neighboring ranging devices.

11. The indoor positioning system of claim 8, wherein when the positioning server positions the target device at the first time, the positioning server regards all of the neighboring ranging devices as the reference ranging devices, and the positioning server calculates the at least one candidate coordinate according to the deploy coordinate of each of the reference ranging devices in the indoor environment, and the positioning server estimates the positioning coordinate at which the target device is located according to the at least one candidate coordinate.

12. The indoor positioning system of claim 8, wherein the positioning server processes the at least one candidate coordinate according to a filter algorithm so as to generate the positioning coordinate.

13. The indoor positioning system of claim 8, wherein the positioning server regards the positioning coordinate as a latest history positioning coordinate of the target device, and the positioning server stores the latest history positioning coordinate in the storage unit.

14. The indoor positioning system of claim 8, wherein the wireless ranging devices and the target device conform to a short-distance wireless communication standard.

15. An indoor positioning system, comprising:
 a plurality of wireless ranging devices deployed in an indoor environment; and
 a target device including a storage unit and a display unit, wherein the target device defines a default positioning weight, and when the target device is located in the indoor environment, the target device is coupled to the wireless ranging devices through a wireless sensing network, and the target device obtains a plurality of neighboring ranging devices by scanning the wireless ranging devices, and the target device calculates a current positioning weight of each of the neighboring ranging devices and compares the default positioning weight and the current positioning weight of each of the neighboring ranging device so as to obtain a plurality of reference ranging devices by selecting a portion of the neighboring ranging devices as the reference ranging devices, wherein the difference between each of the current positioning weights respectively corresponding to the selected neighboring ranging devices and the default positioning weight is smaller than a predetermined value, and the target device calculates at least one candidate coordinate according to a deploy coordinate of each of the reference ranging devices in the indoor environment, and the target device estimates a positioning coordinate at which the target device is located according to the at least one candidate coordinate,
 wherein when an amount of the reference ranging devices is larger than or equal to three, the target device random selects three of the reference ranging devices as selected devices, and the target device generates at least one of the at least one candidate coordinate according to the deploy coordinates respectively corresponding to the selected devices, and the target device repeats the step of random selecting three of the reference ranging devices and the step of generating the candidate coordinate until all combinations of the three selected devices random selected from the reference ranging devices are used for generating the candidate coordinates.

16. The indoor positioning system of claim 15, wherein when the target device is positioned at the first time, all of the neighboring ranging devices are regarded as the reference ranging devices, and the at least one candidate coordinate is calculated according to the deploy coordinate of each of the reference ranging devices in the indoor environment, and the positioning coordinate at which the target device is located is estimated according to the at least one candidate coordinate.

* * * * *